United States Patent
Natchetoi et al.

(10) Patent No.: US 8,583,829 B2
(45) Date of Patent: Nov. 12, 2013

(54) SEMANTIC-BASED LOSSY COMPRESSION

(75) Inventors: Yuri Natchetoi, Ottawa (CA); Huaigu Wu, Brossard (CA); Gilbert Babin, Montreal (CA); Serhan Dagtas, Montreal (CA)

(73) Assignee: SAP AG, Walldorf (DE)

( * ) Notice: Subject to any disclaimer, the term of this patent is extended or adjusted under 35 U.S.C. 154(b) by 832 days.

(21) Appl. No.: 11/873,834

(22) Filed: Oct. 17, 2007

(65) Prior Publication Data

US 2009/0106280 A1  Apr. 23, 2009

(51) Int. Cl.
  *G06F 15/16* (2006.01)
  *G06F 17/21* (2006.01)
(52) U.S. Cl.
  USPC .......................... 709/247; 709/246; 715/248
(58) Field of Classification Search
  USPC .................. 709/201, 217; 715/523
  See application file for complete search history.

(56) References Cited

U.S. PATENT DOCUMENTS

| | | | | |
|---|---|---|---|---|
| 2002/0165988 | A1* | 11/2002 | Khan et al. | 709/246 |
| 2005/0028084 | A1* | 2/2005 | Dziejma | 715/505 |
| 2006/0107206 | A1* | 5/2006 | Koskimies | 715/523 |

OTHER PUBLICATIONS

Cannataro, M., Carelli, G., Pugliese, A., and Sacca, D. Semantic lossy compression of XM: data. In Knowledge Representation Meets Databases. Http://CEUR-WS.org/Vol-45/05-cannataro.pdf.
Choi, B. Document decomposition for XML compression: a heuristic approach. In DASFAA, No. 3382 in LNCS, Singapore. (2006).

* cited by examiner

*Primary Examiner* — Ian N Moore
*Assistant Examiner* — Kiet Tang
(74) *Attorney, Agent, or Firm* — Fish & Richardson P.C.

(57) ABSTRACT

Systems and methods for providing reduced object data to devices. Context can be received from a device. The context can be used to determine what portion of an object is used by an application executed on the device. The object can be reduced prior to communicating the data to the device, thereby conserving resources associated with the device.

20 Claims, 6 Drawing Sheets

(12)  United States Patent

SEMANTIC-BASED LOSSY COMPRESSION

BACKGROUND

This disclosure is related to data compression.

Limited capacity devices (such as mobile phones) need an efficient mechanism to exchange and store data in XML format. All the currently existing solutions are based on uncompressed XML which is commonly used for data exchange. Due to its extremely redundant nature, it is difficult to use in situations where resources, such as communication channel bandwidth or storage capacity are limited. In addition, complex applications such as business-related software typically use short messages with a similar structure which can not be efficiently compressed by the existing compression methods. Therefore complex applications are rarely designed for limited capacity devices.

SUMMARY

A system can include an interface, a object retrieval module and a pruning module. The interface can communicate with a device and receive application context from the device. The application context being associated with an application executed by the device. The object data retrieval module can retrieve a stored object associated with the application. The stored object including a hierarchical data structure used to populate one or more fields associated with the application. The pruning module can generate a reduced object from among data associated with the stored object and being based upon the application context received from the device. The modified object can eliminate a first portion of data from the stored object while including a second portion of data specified by the application context. The interface can communicate the reduced object to the device.

Methods for providing a reduced object can include: receiving an application context from a device, the application context being associated with an application being executed by the device; retrieving a object associated with the application, the object comprising a hierarchical data structure; pruning the object based upon the application context associated with the device, the pruning being operable to generate a reduced object comprising data used by the application as indicated by the application context; and, communicating the reduced object to the device.

DETAILED DESCRIPTION

Figure 1:
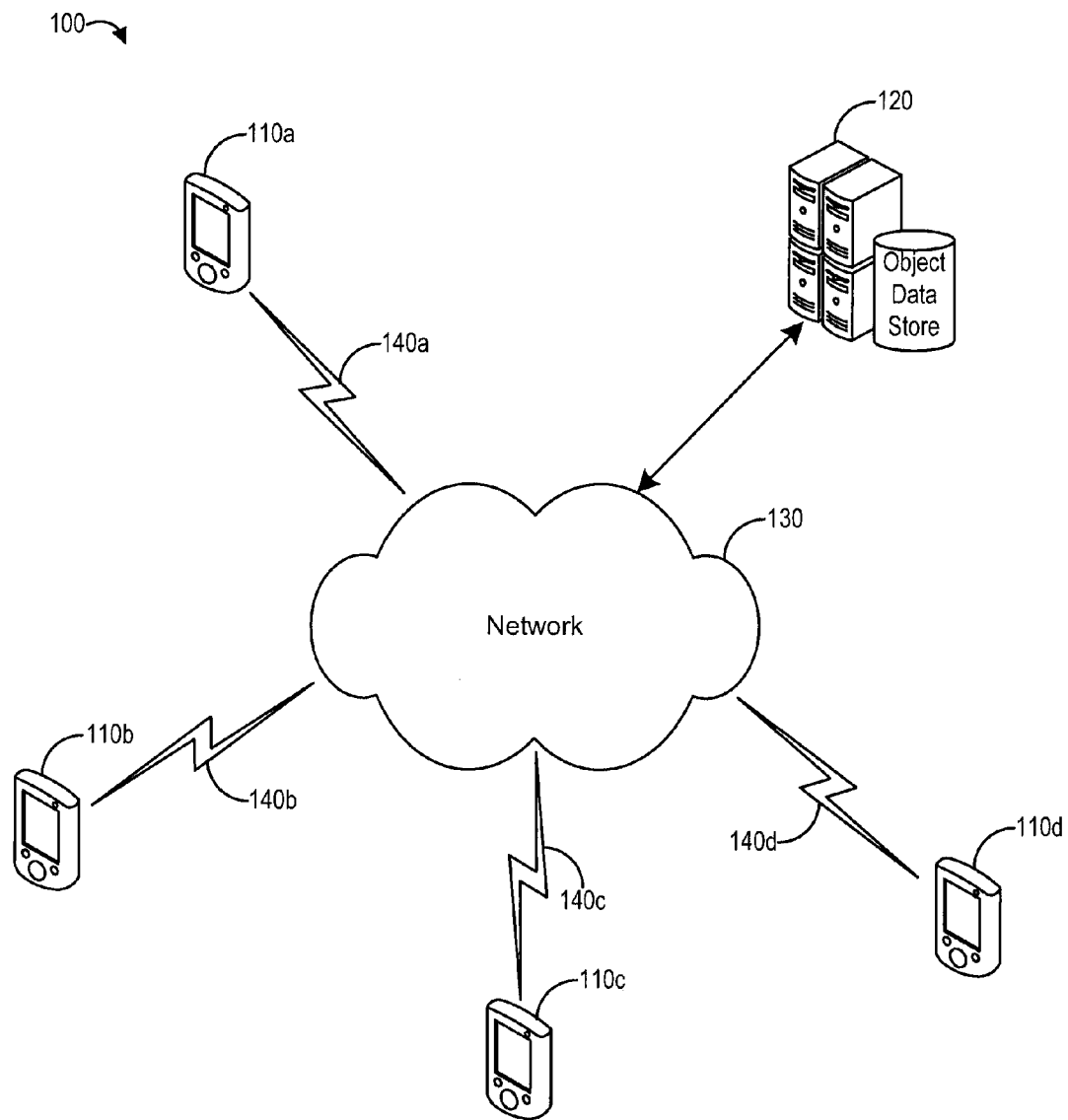
FIG. 1 is a block diagram of an example network architecture for distributed applications.

FIG. 1 is a block diagram illustrating an example network architecture 100 for distributed applications. The architecture 100 can include a number of devices 110*a-d* communicating with an application server 120 through a network 130. In some implementations, devices 110*a-d* can communicate with a network using a communications link 140*a-d*. The communications link 140*a-d* can enable communications between the devices 110*a-d* and an application server 120.

In some implementations, the communications link 140*a-d* can enable the processing associated with an application to be divided between one or more devices 110*a-d* and the application server 120. In such implementations, portions of the processing can be done by the application server 120 and results can be passed to the devices 110*a-d*. For example, Java Platform, Micro Edition (J2ME) available from Sun Microsystems, Inc. of Santa Clara, Calif., can be used to allow distributed processing for resource constrained devices (e.g., mobile phones, PDAs, mobile e-mail clients, mobile web clients, set-top boxes, etc.).

In some implementations, the communications link 140*a-d* can be a wireless signal. For example, the communications link 140*a-b* can be a cellular signal, an Institute of Electrical and Electronics Engineers (IEEE) 802.1x standard signal, a Bluetooth signal, among many others. In other implementations, the communications link 140*a-d* can be a wireline signal. For example, in those instances when the device 110*a-d* is a set-top box, the communications link 140*a-d* can be a cable signal. In other examples, when the device 110*a-d* is a telephone, the communications link 140*a-d* can be a telephone wire. Other types of devices 110*a-d* and communications links 140*a-d* can be used.

In some implementations, the device 110*a-d* can be constrained by a communication link 140*a-d*. For example, in those instances where the devices 110*a-d* are cellular phones, the communications link 140*a-d* (e.g., cellular signal) might not have enough bandwidth to effectively communicate the information used by the application from the application server 120 to the device 110*a-d*. In some implementations, the application server 120 can generate a reduced version of the information (e.g., objects) requested by the application and transmit the reduced version to the device 110*a-d*.

In other implementations, the device 110*a-d* can be constrained by its own system resources. For example, in those instances where the devices 110*a-d* are cellular phones, the processor and/or memory associated with such devices 110*a-d* might be inadequate to handle the processing power and/or memory used by the application and/or objects associated with the application. In some implementations, the application server 120 can generate a reduced version of the information (e.g., objects) used by the application, and transmit the reduced version to the device 110*a-d*.

Figure 2:
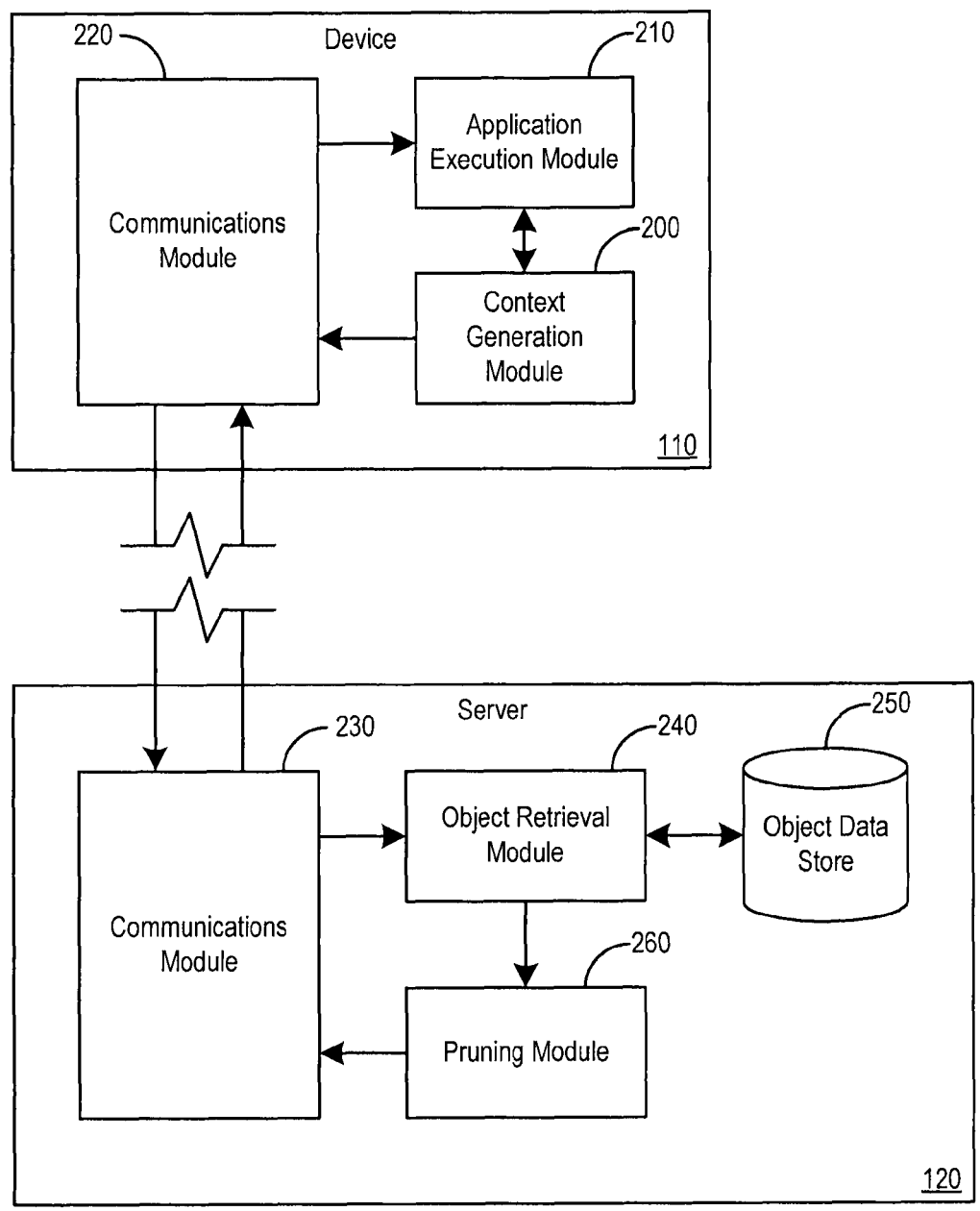
FIG. 2 is a block diagram of an example system utilizing reduced object data.

FIG. 2 is a block diagram illustrating an example system utilizing reduced object data. In some implementations, a device 110 can request object data from the application server 120 for use with an application being executed by the device 110. In some implementations, the request can include application context associated with the execution of the application by the device 110.

In some implementations, the application context can be generated by a context generation module 200. The context generation module 200 can inspect the application being initiated by an application execution module 210 and determine context associated with the application. In various examples, application context can include the particular data and/or libraries required by the application execution module 210 to execute the application. The device 110 can transmit the application context to the application server 120.

In some implementations, the application context can be transmitted to the application server 120 by a communications module 220. The communications module 220 can be any module suitable to transmit information between the device 110 and the application server 120. In various examples, the communications module 220 can be a wireless interface card, an ethernet card, a Bluetooth module, or any other appropriate communications module 220 given the communications medium between the application server 120 and the device 110.

In some implementations, the application server 120 can receive application context from the device 110 through its own communications module 230. The communications module 230 can mirror the communications module 220 of the device 110. For example, if the device's communications module 220 is an IEEE 802.1x module, the application server's communication module 230 would be a similar IEEE 802.1x module or any other communications module 230 compatible with IEEE 802.1x.

The communications module 230 can pass the application context to an object retrieval module 240. In some implementations, the object retrieval module 240 can receive the application context and locate an object associated with the application context in an object data store 250. The object data store 250 can include storage for one or more objects and/or libraries associated with execution of an application by the device 110. Upon retrieving the object from the object data store, the object retrieval module 240 can pass the object and application context to a pruning module 260.

In some implementations, the pruning module 260 can generate a reduced object associated with the retrieved object and based upon the application context. For example, an object stored by the application server 120 might include detailed information about an expansive hierarchy, such as, for example, a business object. In various examples, business objects can include a wide variety of information, including, for example, employee names (e.g., first, last, middle, etc.), e-mail address(es), telephone number(s) (e.g., home, direct, cellular, pager, fax, etc.), organization(s), and/or supervisor(s), among many others, and combinations thereof.

While the application might call the entire business object, the application might use the business object only for a specific purpose. For example, an application might only use first name, last name and e-mail address. In such examples, communication of an entire business object structure can waste bandwidth and system resources associated with the device 110. The pruning module 260 can therefore eliminate portions of the object which are not used by the application. Those portions of the object which are not being used can be identified using the application context received from the device 110. Thus, the pruning module 260 can generate a reduced object by removing data not identified by the application context, and can provide the reduced object to the communications module 230.

In some implementations, the communications module 230 can receive the reduced object from the pruning module 260 and can provide the reduced object to the device 110. The device 110 can receive the reduced object from the application server 120 through the communications module 220, and can provide the reduced object to the application execution module 210. The application execution module 210 can use the reduced object to execute the application and provide the output to a user of the device 110.

In some implementations, the reduced object can be compressed prior to being transmitted from the application server 120 to the device 110 using a compression module. The compression module can use any available compression technique to compress the data included in the reduced object. In some implementations, the available compression techniques are limited by the device 110, the application server 120, and/or a communications medium between the device 110 and the application server 120.

Figure 3:
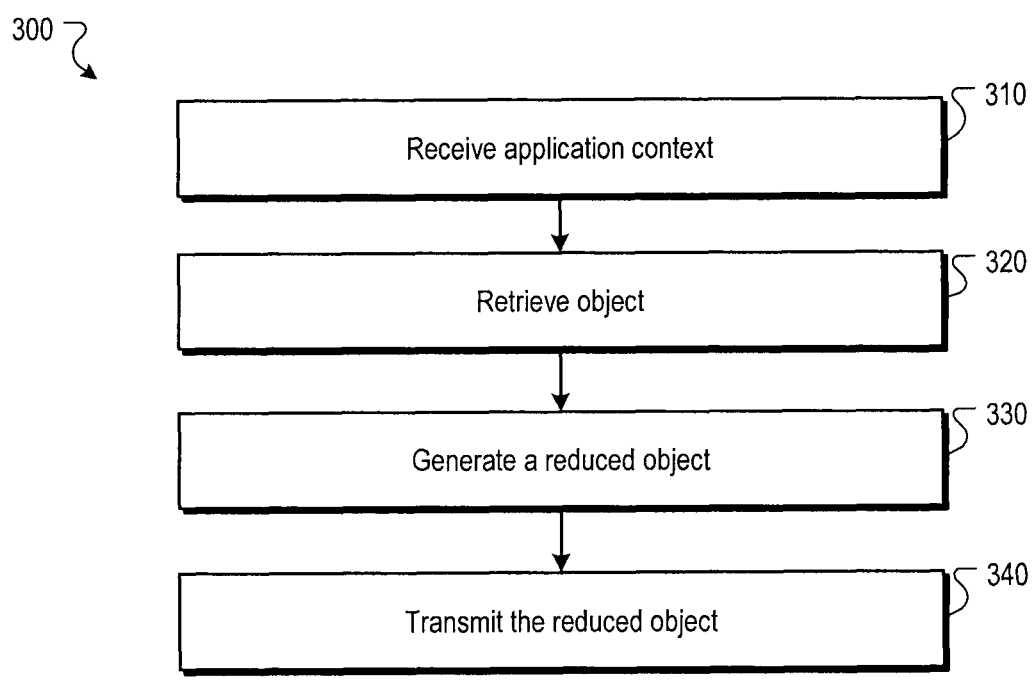
FIG. 3 is a flowchart of an example method used to provide reduced object data.

FIG. 3 is a flowchart illustrating an example method 300 used to provide reduced object data. Application context is received at stage 310. Application context can be received, for example, by an interface (e.g., communications module 230 of FIG. 2). The application context can be supplied by a device executing an application associated with the application context. In some implementations, the application context can include those fields and/or libraries used by the application. In some implementations, the application context can be accompanied by a request for an object and/or library. In other implementations, the receipt of application context can indicate a request for an object and/or library.

An object is retrieved at stage 320. The object can be retrieved, for example, by a data retrieval module (e.g., object retrieval module 240 of FIG. 2) in conjunction with a data store (e.g., object data store 250 of FIG. 2). In some implementations, the object can include a hierarchical data structure. For example, the object might include an extensible markup language (XML) document. In some implementations, the hierarchical data structure can be represented by a tree representation or an indentation oriented model showing the relationships between the data.

A reduced object can be generated at stage 330. The reduced object can be generated, for example, by a reduction module (e.g., pruning module 260 of FIG. 2). In some implementations, the reduced object can be generated based on the application context. For example, in those instances in which the application context indicates that an application will use a certain portion of an object and/or library, the object can be reduced to only that portion of the object and/or library that will be used by the application. In additional implementations, the reduced object data can be compressed based on a compression algorithm.

The reduced object can be transmitted at stage 340. The reduced object can be transmitted, for example, by an interface (e.g., communications module 230 of FIG. 2). The reduced object can be transmitted to the device that provided the application context. In some implementations, the reduced object can be a compressed reduced object. In such implementations, the reduced object can be compressed using any suitable compression algorithm.

Figure 4:
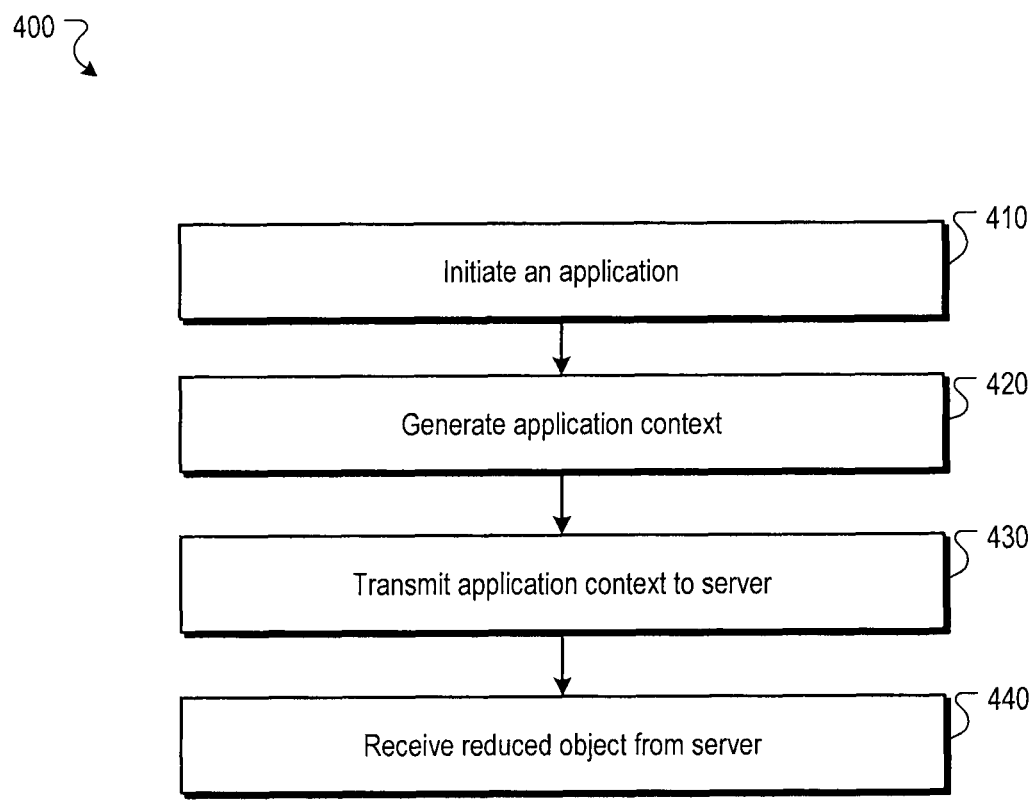
FIG. 4 is a flowchart of an example method used to obtain reduced object data.

FIG. 4 is a flowchart illustrating an example method 400 used to obtain reduced object data. An application is initiated at stage 410. The application can be initiated, for example, by a processor (e.g., an application execution module 210 of FIG. 2). In some implementations, the application can be initiated based upon input received by a user of a device associated with the processor. For example, a user might initiate an application by selecting the application using an interface associated with the device.

Application context can be generated at stage 420. Application context can be generated, for example, by a context generation module (e.g., context generation module 200 of FIG. 2) in conjunction with a processor (e.g., application execution module 210 of FIG. 2). In some implementations, upon initiation of an application, the application can be analyzed to determine which portions of an object and/or a library will be used by the application. In other implementations, the application can include references to the specific portions of an object and/or library that will be used by the application.

Application context can be transmitted to a server at stage 430. The application context can be transmitted to the server, for example, by an interface (e.g., communications module 220 of FIG. 2). In some implementations, the application context can be transmitted to the server using a communications medium (e.g., communications link 140 of FIG. 1). The communications medium, for example, can be a wired or wireless medium. Other communications media can be used.

A reduced object can be received at stage 440. The reduced object can be received, for example, by an interface (e.g., communications module 220 of FIG. 2). In some implementations, the reduced object can be reduced based upon application context. For example, the reduced object can include any portions of the object that are used by the application associated with the application context. The reduced object can be used by a processor (e.g., application execution module 210 of FIG. 2) to execute the application associated with the application context.

In some implementations, XML messages transmitted between two entities (client or server) can be reduced based on application context. Such reduction of XML messages can enable the deployment of complex applications on resource constrained devices. In some implementations, the reduction is a lossy compression of XML data based upon data demand.

In various implementations, such lossy compression methods can be used in combination with other types of compression methods, or can be used alone. XML messages can be reduced using information about elements, required on the client-side.

Figure 5:
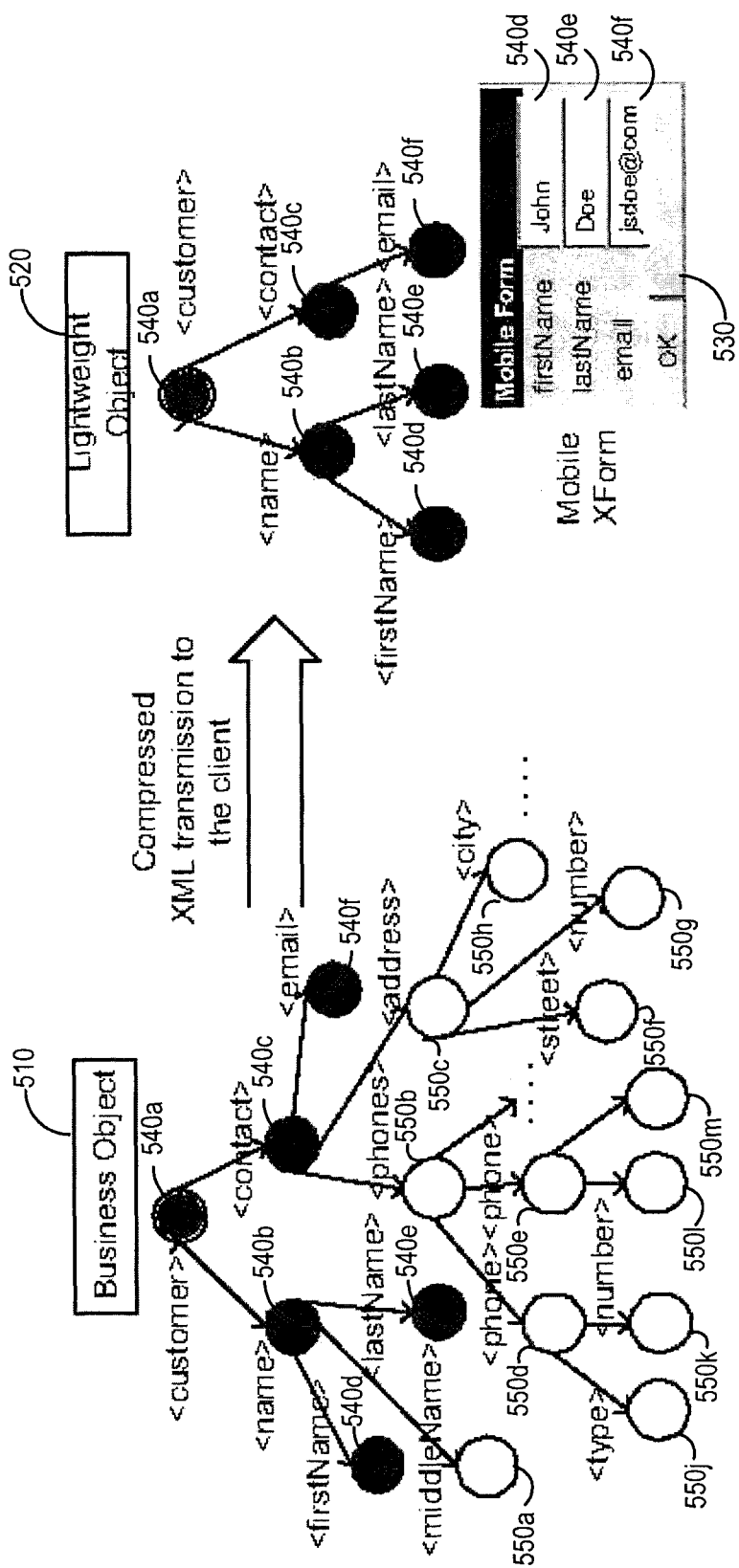
FIG. 5 is a data structure of an example reduction of object data.

Lossy compression methods can begin by gathering the information requirements of the client-side application in the form of absolute XPaths. FIG. 5 shows an example of an XML object 510 on the server side and the reduced object 520 on the client-side. In various implementations, a pruning module can use information about fields in the Xform 530 of the client application. The fields in the Xform 530 can identify the data used by the client and can enable reduction of the size of the XML message sent to the client, since the data transmitted to the client is limited to the specific data used by the client.

For example, a mobile client application may display partial employee information. In some implementations, that specific information used is expressed by an XForms description 530, such as shown in FIG. 1. From the XForm description 530, the XPaths of object data 540a-f can be extracted.

FIG. 5 is a data structure of an example reduction of an object. In some implementations, compression of the business object 510 can based upon the application context. The business object 510 includes an XML document describing a specific instance of class "employee" 540a. Nodes 540a-f are those nodes for which there is a matching node used by the application. Because nodes 550a-m of this example are not used by the XForm, only nodes 540a-f of the XML document are transmitted. Unused nodes 550a-m can be removed from the XML message transmitted to the client.

In some implementations, the application context or registration can include the set of data attributes that are read or written by the client application. The application context can be extracted from the client application. It could be done by the developer. However, such a process could be error prone. For example, the list of attributes might be incomplete, incorrect, out of date, etc. A reduced object model can simplify the application context extraction process because client-side applications can register the data attributes being used by the application.

In some implementations, the components $c \in \mathfrak{C}$ associated with an application can specify a set of registry entries $\mathfrak{R}$. A registry entry, for example, can be a triple (a; $o_a$; p(A(a))) $\in \mathfrak{R}$ where a is an attribute used by the application, $o_a$ is the object containing attribute a, and p(A(a)) is the XPath to reach that attribute in the corresponding XML document $X^{o_a}$. Each of the registry entry sets can be merge into a global set $\mathfrak{R} = \cup c \in \mathfrak{C}\ \mathfrak{R}$. Based upon the registry $\mathfrak{R}$ the usage matrix $\mathcal{U}$ is defined as: $\mathcal{U}(c,a)=\text{true} \Leftrightarrow (a, o_a, p(A(a))) \in \mathfrak{R}$.

For instance, a mobile client application can display partial employee information (that subset that is most useful for the manager). For example, such information can be specified using an XForms description, such as shown in Table 1.

TABLE 1

| | |
|---|---|
| <xforms> | <input ref="/employee/name/firstName"> |
|   <model> | <label>firstName</label></input><br /> |
|     <instance> | |
|       <employee> | <input ref="/employee/name/lastName"> |
|         <name> | <label>lastName</label></input><br /> |
|           <firstName/> | |
|           <lastName/> | <input ref="/employee/contact/email"> |
|         </name> | <label>email</label></input><br /> |
|         <contact> | |
|           <email/> | <submit submission="url1"> |
|         </contact> | <label>Ok</label></submit> |
|       </employee> | </xforms> |
|     </instance> | |
|   <submission id="email" | |
| method="get" | |
|         action="submit.- | |
|         jsp"/> | |
| </model> | |

Based upon the XForm description, the XPaths of required data can be extracted. In this particular example, the tree entries shown in Table 2 can be entered into the registry.

TABLE 2

| ( | a, | , | $o_a$, | , | p(A(a)) | ) |
|---|---|---|---|---|---|---|
| ( | first | , | Employee | , | /employee/name/first | ) |
| ( | last | , | Employee | , | /employee/name/last | ) |
| ( | email | , | Employee | , | /employee/contact/email | ) |

Given a registry $\mathfrak{R}$ a pruning tree $T^{\prime o}$ can be constructed for each object $o \in \mathfrak{O}$ used in the application. The pruning tree $T^{\prime o}$ can be constructed using a buildTree $\Leftrightarrow$ algorithm. A head (p) method can return the first path element of p while the tail(p) method can return each of the path elements of p with the first element removed. In those instances where p contains a single element, tail(p) returns the empty set Ø.

FIG. 5 shows how the actual compression proceeds once $T^{\prime o}$ has been built. The left side shows a tree model of the XML document. In this example, the XML document describes a specific instance of class "Employee." The black nodes 540a-f are those nodes for which there is a matching node in $T^{\prime o}$. Because this data is used by the XForm and the other data is not, the other data included in the XML document can be removed.

Figure 6:
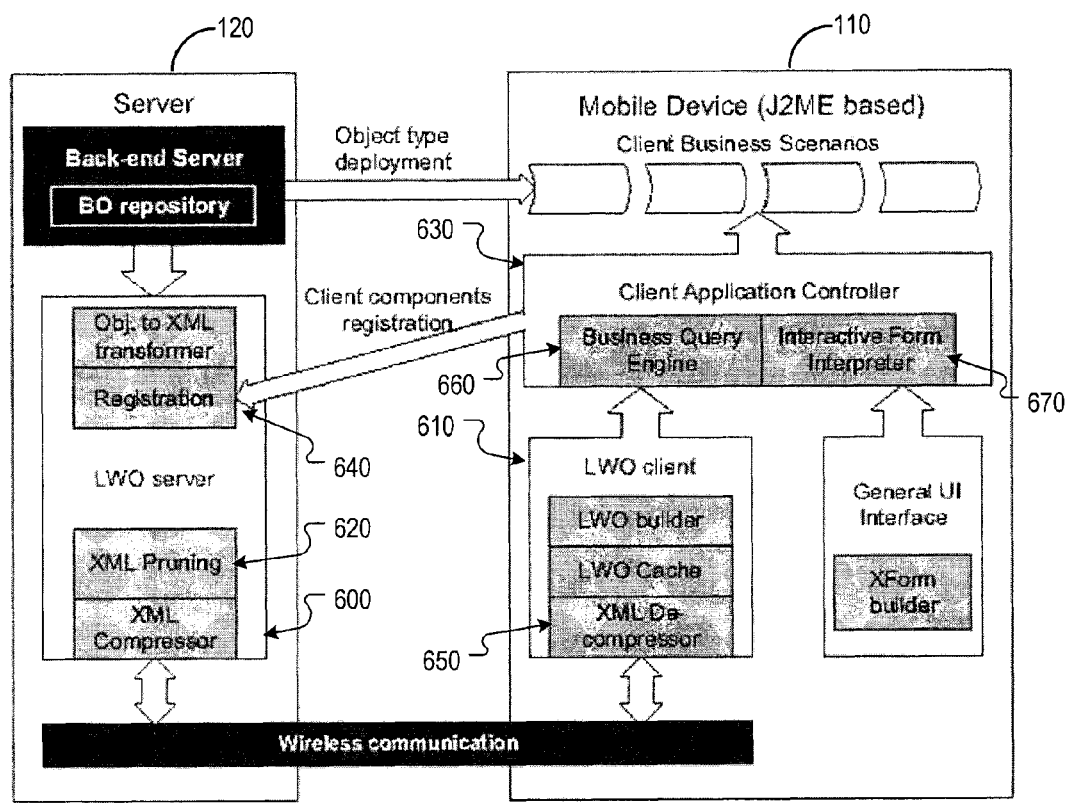
FIG. 6 is a block diagram of an example compression system using a lightweight object (LWO) model.

FIG. 6 is a block diagram illustrating an example compression system for mobile devices. The compression system can include a component-based framework for applications targeting mobile devices 110. In some implementations, the compression system can include a lightweight object (LWO) model, a business query engine 660 and an interactive form interpreter 670 to process enterprise data. The LWO model can be split into LWO server 600 and LWO client 610 components. Objects can be serialized and transmitted from servers to mobile clients as XML messages. Because such messages may be large, due to the complexity of objects and the nature of XML, resource constrained devices have difficulty processing such messages. Thus, the size of the XML messages can be reduced. In order to reduce message size, a lossy compression mechanism can be applied to objects to reduce the objects to generate lightweight objects. In some implementations the lossy compression mechanism can be an XML pruning module 620 used to reduce the message, keeping data used by the application (as registered by a client application controller 630 with a registration module 640).

In some implementations, lossless compression can be applied to the pruned XML files to generate compressed reduced messages. On the client side, compressed reduced messages can be de-compressed into lightweight objects by an XML de-compressor 650. Upon decompression the reduced object(s) can be used by client applications.

In order to prune objects, the LWO server 600 can have knowledge of object usage to identify which information will not be used on the client side 110. On the client side 110, users can access objects through the business query engine 660 using an object oriented data query language like hibernate query language (HQL). Users can also access these objects through the Interactive Form Interpreter 670 using XForms. In any case, the list of data elements used on the client side can be clearly identified from HQL statements or XForms.

The framework's data can be represented by a large XML model, where the instances of object have their own respective unique XPath id. This framework can implements an application repository for the model that contains entry points for the objects. The Java Platform, Micro Edition (J2ME) application includes of a number of small Java components. The components have a registration procedure that adds the list of data entries that each component uses to the registry 640. In various implementations, the list can be stored in the component configuration file included in the component package. The registry can include the status of the object. For example, the object can exist the server side, the object can be cached locally, or the object can be available in memory. Using this architecture, all XPath expressions that a particular application uses can be retrieved. In some implementations, even if registration of the object data is not performed by the modules, the object data can be extracted from the application using, for example, code analysis or class reflection.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus. The tangible program carrier can be a non-transitory computer readable medium. The non-transitory computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
one or more computers, including a server and a mobile device; and
a computer-readable medium coupled to the one or more computers having instructions stored thereon which, when executed by the one or more computers, cause the one or more computers to perform operations comprising:
generating by a context generation module executed on the mobile device, application context data by inspecting an application initiated by an application execution module executed by the mobile device, and for each of a plurality of data elements required by the application to display a populated form on the mobile device, identifying a path for reaching the data element in a hierarchical object stored on the server, the plurality of data elements comprising nodes of the hierarchical object, the application context data comprising the paths,
communicating the application context data from the mobile device to the server,
locating, at the server, the hierarchical object from a plurality of stored hierarchical objects based on the application context data, each stored hierarchical object being associated with execution of the application,
identifying, using the application context data, nodes of the hierarchical object which are not used by the application to display the populated form on the mobile device, by the server,
generating a reduced object by pruning a tree representation of the hierarchical object to eliminate the nodes of the hierarchical object which are not used by the application to display the populated form on the mobile device, by the server,
communicating the reduced object to the mobile device,
using the reduced object to display the data elements in one or more fields of the populated form, by the mobile device.

2. The system of claim 1, wherein the paths are identified using information describing one or more fields of the form used by the application being executed on the mobile device.

3. The system of claim 2, wherein the information comprises an XForms description.

4. The system of claim 1, wherein the hierarchical object comprises a database of employee information.

5. The system of claim 1, wherein the hierarchical object comprises an eXtensible Markup Language (XML) document.

6. The system of claim 1, wherein the operations further comprise compressing the reduced object using lossless compression, prior to communication to the mobile device.

7. The system of claim 1, wherein generating the reduced object further comprises applying lossy compression to the hierarchical object.

8. The system of claim 1, wherein the paths comprise absolute XPaths.

9. A non-transitory computer storage medium encoded with a computer program, the program comprising instructions that when executed by data processing apparatus cause the data processing apparatus to perform operations comprising:
receiving, at a server device, application context data, the application context data being generated by a context generation module executed on the mobile device and being generated by:
inspecting an application initiated by an application execution module executed by the mobile device, and
for each of a plurality of data elements required by the application to display a populated form on the mobile device, identifying a path for reaching the data element in a hierarchical object stored on the server device, the plurality of data elements comprising nodes of the hierarchical object and the application context data comprising the paths;
locating, at the server device, the hierarchical object from a plurality of stored hierarchical objects based on the application context data, each stored hierarchical object being associated with execution of the application, identifying, using the application context data, nodes of the hierarchical object which are not used by the application to display the populated form on the mobile device;

generating a reduced object by pruning a tree representation of the hierarchical object to eliminate the nodes of the hierarchical object which are not used by the application to display the populated form on the mobile device;

communicating the reduced object to the mobile device for use in displaying the data elements in one or more fields of the populated form on the mobile device.

10. The non-transitory computer storage medium of claim 9, wherein the paths are identified using information describing one or more fields of the form used by the application being executed on the mobile device.

11. The non-transitory computer storage medium of claim 10, wherein the information comprises an XForms description.

12. The non-transitory computer storage medium of claim 9, wherein the hierarchical object comprises a database of employee information.

13. The non-transitory computer storage medium of claim 9, wherein the hierarchical object comprises an eXtensible Markup Language (XML) document.

14. The non-transitory computer storage medium of claim 9, wherein the operations further comprise compressing the reduced object using lossless compression, prior to communication to the mobile device.

15. The non-transitory computer storage medium of claim 9, wherein generating the reduced object further comprises applying lossy compression to the hierarchical object.

16. The non-transitory computer storage medium of claim 9, wherein the paths comprise absolute XPaths.

17. A server-implemented method comprising:
receiving, at a server device application context data, the application context data being generated by a context generation module executed on the mobile device and being generated by:
  inspecting an application initiated by an application execution module executed by the mobile device, and
  for each of a plurality of data elements required by the application to display a populated form on the mobile device, identifying a path for reaching the data element in a hierarchical object stored on the server device, the plurality of data elements comprising nodes of the hierarchical object and the application context data comprising the paths;
locating, at the server device, the hierarchical object from a plurality of stored hierarchical objects based on the application context data, each stored hierarchical object being associated with the execution of the application;
identifying, using the application context data, nodes of the hierarchical object which are not used by the application to display the populated form on the mobile device;
generating a reduced object by pruning a tree representation of the hierarchical object to eliminate the nodes of the hierarchical object which are not used by the application to display the populated form on the mobile device;
communicating the reduced object to the mobile device for use in displaying the data elements in one or more fields of the populated form on the mobile device.

18. The method of claim 17, wherein the paths are identified using information describing one or more fields of the form used by the application being executed on the mobile device.

19. The method of claim 18, wherein the information comprises an XForms description.

20. The method of claim 17, wherein the hierarchical object comprises a database of employee information.

* * * * *